July 5, 1938.  A. A. HORN  2,123,047
CREAM REMOVER
Filed May 14, 1935
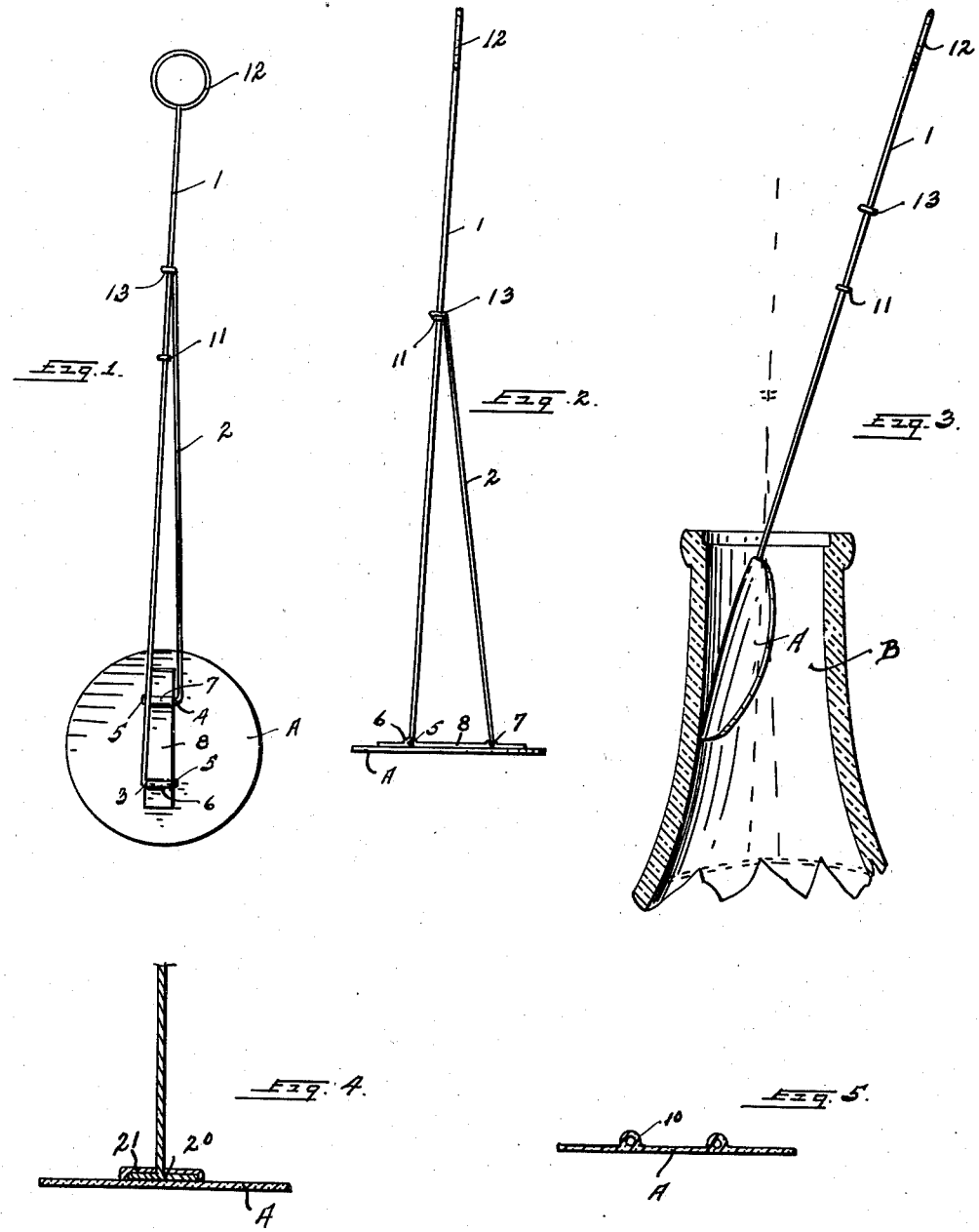
Inventor
Amos A. Horn
By R. M. Thomas
Attorney Patented July 5, 1938

2,123,047

UNITED STATES PATENT OFFICE 2,123,047

CREAM REMOVER

Amos A. Horn, Grand Junction, Colo.

Application May 14, 1935, Serial No. 21,408

1 Claim. (Cl. 210—51.5)

My invention relates to cream removers and has for its object to provide a new and efficient device for removing the cream from the top of milk when in bottles.

A further object is to provide a sanitary cream separator which when placed in a milk bottle separates the cream from the milk and allows the housewife to pour the cream off from the top of the milk without mixing the cream into the milk and without the milk coming out of the bottle.

A still further object is to provide a cream remover which will loosen any heavy cream from the neck of the bottle when it is used so that there will not be any heavy cream left around the neck of the bottle after the cream has been poured therefrom.

These objects I accomplish with the device illustrated in the accompanying drawing in which similar numerals and letters of reference indicate like parts throughout the several views and as described in the specification forming a part of this application and pointed out in the appended claim.

In the drawing in which I have shown my device

Figure 1 is a view of the device folded for inserting into the neck of a milk bottle.

Figure 2 is a side view of the device ready for use in the position it will have when the handles have been operated prior to pulling it up into the neck of the milk bottle.

Figure 3 is a sectional view of the neck of a milk bottle showing how the device is inserted into the bottle to remove the heavy cream from the sides of the neck and at the same time not disturb the cream. Dotted lines show the position of the device when ready to pour the cream from the bottle sealing the milk into the lower portion of the bottle.

Figure 4 is a section of a modified form of making the device.

Figure 5 is a sectional view of a modified flexible plate having bearings formed as an integral portion thereof.

In the drawing I have shown my device as a circular plate A of some flexible material preferably of very thin flexible metal or rubber. This plate is provided with two handles 1 and 2 each being secured pivotally to the plate by bending the ends 3 and 4 into cross shafts with the extreme ends 5 turned up to lock the ends of the shafts and prevent their being withdrawn from the bearings 6 and 7.

The bearings 6 and 7 are made from a strip 8 of material secured to the face of the plate A, with the two spaced apart bearings formed therein. If the plate A is made of metal then the strip 8 will also be made of a like metal and will be welded or soldered thereto but if the plate A is made of rubber then the strip 8 may be made either of fabric covered rubber, or rubber, or of any other flexible material which can be secured to the rubber. As shown in Figure 5, the rubber plate A may be cast with the lugs 10 thereon with the lugs to act as the bearings for the handles.

The longer handle 1 has a lug 11 formed thereon and the extreme end of the handle is formed into a handle ring 12. The end of the handle 2 is formed into a small ring 13 encircling the handle 1 above the lug 11 and when the handle 1 is raised by the hand ring 12, the ring 13 slides down the handle 1 until it engages the lug at which time the plate A is in a horizontal position or at right angles to a line bisecting the angle of the two handles and in this position it is ready for use.

In the modified form shown in Figure 4 the ends of the handles are made T-shaped at 20 fitting into sockets 21 in the plate A.

The operation of the device is as follows:

The handles are moved into a position placing them parallel to the plate A or in the folded down position and the plate A is then curved by the fingers to fit into the neck B of the milk bottle. The plate A is then slid down the inside neck of the bottle adjacent the glass surface, freeing any extra heavy cream from the inner surface of the neck of the bottle. When the plate A has reached a level in the bottle slightly below the level of the cream therein, the handle 2 is released by the operator and the handle 1 is held by the ring 12. The ring 12 is then raised which raises the plate A in a horizontal position into the neck of the bottle. When the plate A is raised into the neck of the bottle until it meets the side walls thereof, it is given a slight upward pressure to insure its sealing the cream from the milk and the bottle may then be tilted on its side draining or pouring off all of the cream and leaving the milk sealed into the bottom of the bottle by the plate A. When this has been accomplished the two handles are released by pressing down on the handle 1 and the device is then withdrawn from the bottle with the plate A curved to engage the opposite side of the bottle from that in which it was introduced and any heavy cream which remained on this side of the bottle when the cream was poured off will be drawn out by the edges of the plate A.

Having thus described my invention I desire to secure by Letters Patent and claim:

In a cream remover for narrowing necks of milk bottles comprising a circular flexible plate; a strip of material secured diametrically across the top side of said plate having spaced apart bearings formed therein equidistant from each edge of said plate, said strip of material to act as a stiffening strip transversely of said plate; a long handle for operating and controlling said plate having a finger ring formed in the free end thereof and having the engaging end bent into a crank handle and passed through one of said bearings in said strip; another shorter handle having the top end formed into a ring encircling said long handle and having the bottom end of the short handle bent to form a crank to pass through the other one of said bearings; a lug on said long handle to be engaged by the encircling ring of said shorter handle, said ring to engage said lug and hold the plate in a transverse position when force is applied to the longer handle locking the plate in the neck of a milk bottle or said plate to be disengaged by pressure applied to said longer handle and the two handles used to bend said plate along the sides of the stiffening strip to remove the entire device from a milk bottle, substantially as described.

AMOS A. HORN.